US006892952B2

(12) United States Patent
Chang et al.

(10) Patent No.: US 6,892,952 B2
(45) Date of Patent: May 17, 2005

(54) MULTI-FUNCTIONAL WATER CONTROL MODULE

(75) Inventors: Chee Ann Chang, Hong Kong (CN); Kai Wai Wu, Hong Kong (CN); Wai Man Yuen, Hong Kong (CN)

(73) Assignee: Ewig Industries Co., Ltd., Hong Kong (CN)

(*) Notice: Subject to any disclaimer, the term of this patent is extended or adjusted under 35 U.S.C. 154(b) by 96 days.

(21) Appl. No.: 10/330,643

(22) Filed: Dec. 27, 2002

(65) Prior Publication Data

US 2003/0125842 A1 Jul. 3, 2003

Related U.S. Application Data

(60) Provisional application No. 60/343,961, filed on Dec. 28, 2001.

(51) Int. Cl.$^7$ ............................ E03C 1/04; G05D 23/13

(52) U.S. Cl. ........................... 236/12.12; 236/94; 4/676

(58) Field of Search ................................ 236/12.12, 94; 4/676

(56) References Cited

U.S. PATENT DOCUMENTS

| | | | | |
|---|---|---|---|---|
| 4,965,894 A | * 10/1990 | Baus | | 4/605 |
| 5,062,164 A | * 11/1991 | Lee et al. | | 4/194 |
| 5,174,495 A | 12/1992 | Eichholz et al. | | |
| 5,913,614 A | 6/1999 | Smith et al. | | |
| 5,960,857 A | 10/1999 | Oswalt et al. | | |
| 6,438,770 B1 | * 8/2002 | Hed et al. | | 4/668 |
| 6,473,917 B1 | * 11/2002 | Mateina | | 4/676 |
| 6,481,634 B1 | * 11/2002 | Zosimadis | | 236/12.12 |
| 6,513,723 B1 | * 2/2003 | Mueller et al. | | 236/46 R |
| 6,549,816 B2 | * 4/2003 | Gauthier et al. | | 700/32 |

FOREIGN PATENT DOCUMENTS

| | | |
|---|---|---|
| EP | 0297884 A1 | 1/1989 |
| EP | 0299696 A3 | 1/1989 |
| WO | WO 97/18359 | 5/1997 |

OTHER PUBLICATIONS

"millennium series", Product Catalog: The Aquatic Difference Distributor Locator, Mar. 27, 2003, pp. 1–3, http://www.aquaticwhirlpools.com/millenium.shtml.

"Century series features: Bath–side electronic control", Mar. 27, 2003, 1 page, http://www.whirlpools–bathtubs–jacuzzi-.com/aquatic–whirlpool–bathtubs/century–24.htm.

"BEEBULL ENG.SDN BHD", Mar. 27, 2003, 1 page htp://www.worldwaterheaters.com/displaycom.asp?cat=BEE-BULL+ENG.+SDN+BHD.

"Product Details", Mar. 27, 2003, 1 page, http://www.worldwaterheaters.com/detail.asp?id=99.

"Product Details", Mar. 27, 2003, 1 page, http:www.worldwaterheaters.com/detailasp?is=100.

"Tylo Shower Cabins", Mar. 27, 2003, 1 page, http:www.almostheaven.net/aho/tylopers.htm.

"April Shower Filter with Energy Saver Showerhead", Mar. 27, 2003, 1 page. http://www.bestfilters.com/product.asp-?ProductID=WS002.

"Sparkling Spray Shower Filter", Mar. 27, 2003, 1 page, http:www.shop.store.yahoo.com/healthyenvironments/sparspraysho.html.

European Search Report for European Application No, EP 02028813, completed Apr. 7, 2003, Examiner M. Kurtulan.

* cited by examiner

*Primary Examiner*—Harry B. Tanner
(74) *Attorney, Agent, or Firm*—Lathrop & Gage, LC

(57) ABSTRACT

A water control module is provided that monitors water temperature in plumbing, such as shower plumbing, and receives certain input commands from a user. The water control module may, in one example, control shower water flow temperature to preferential temperature values. Control of shower water flow temperature is accomplished by receiving user input of desired water temperature on a user interface, sensing current water temperature in the plumbing, and processing the user inputs and sensed water temperature values to control water delivery temperature. In another example, the water control module may provide a display screen with numerical and/or graphical features to inform the user of desired and/or measured temperature values.

34 Claims, 8 Drawing Sheets

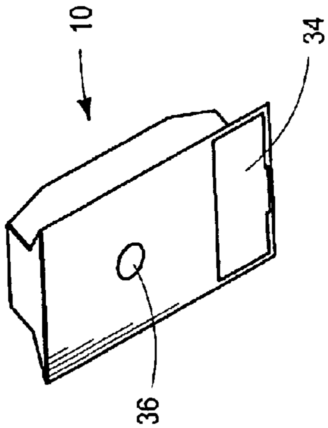
FIG. 2D
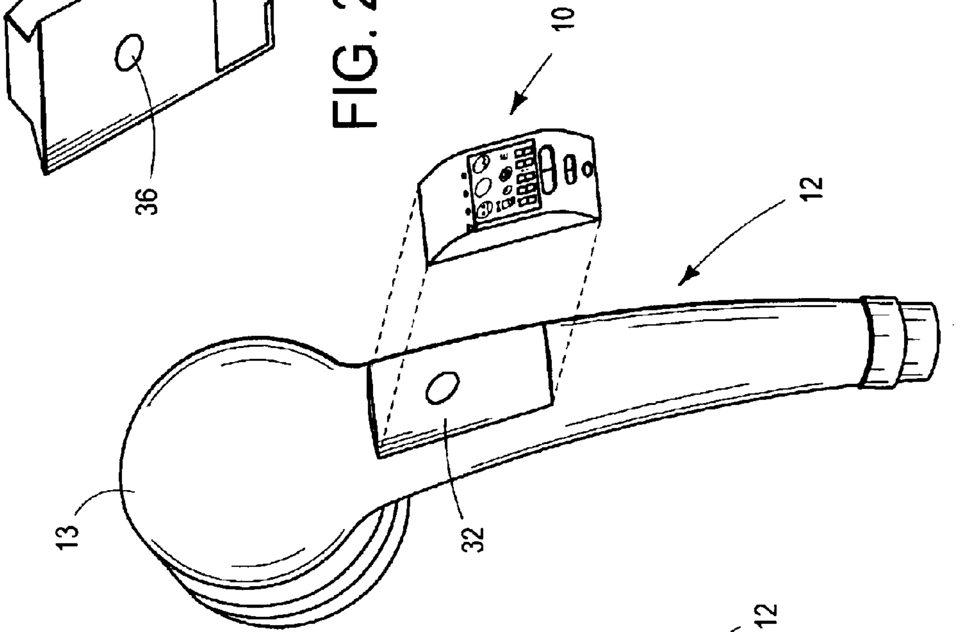
FIG. 2C
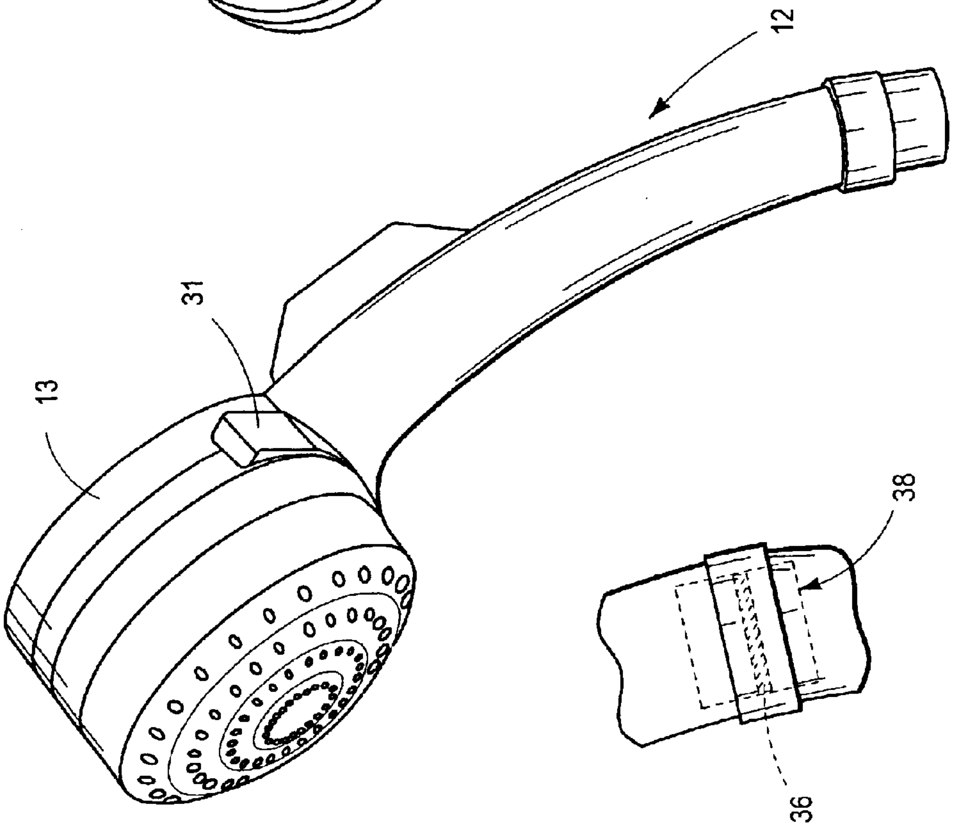
FIG. 2B
FIG. 2A

MULTI-FUNCTIONAL WATER CONTROL MODULE

RELATED APPLICATIONS

This application claims priority to U.S. provisional application Ser. No. 60/343,961, filed Dec. 28, 2001, entitled "MULTIFUNCTIONAL WATER CONTROL MODULE" and which is incorporated herein by reference.

BACKGROUND

People the world over take daily showers to attend to personal hygiene. Shower technology has advanced in the prior art to include many variations of mechanical shower valves that permit manual adjustment of a shower's water temperature. Nonetheless, due to fluctuating water temperatures, these persons also spend considerable time adjusting the valves to maintain the desired temperatures. Not only is this a cumbersome chore, the fluctuating water temperature can cause damage to human skin if temperatures rise sufficiently. Likewise, a quick drop in temperature may create a very uncomfortable sensation and can shock the nervous system.

In bathtubs, the prior art provides floating thermometers that may be monitored to assure desired temperatures; however such devices only monitor the in-tub water and do not monitor water from the faucet.

It is therefore quite difficult to ensure correct water temperatures in modern bathing. Often, the process is trial and error, resulting in wasted time, water and energy to heat the wasted water.

SUMMARY

A multi-functional water control module is provided that monitors running water temperature in real time. The water control module may, for example, be used to control shower water flow temperature to preferential desired temperatures. Also, the water control module may have a display screen to provide visual and user control of the module.

In one aspect, the water control module connects with a shower head to provide temperature, massage and filter selections, to facilitate user control over temperature and water spray characteristics. The water control module may connect with house water flow by several techniques; it may for example attach to a showerhead or to a water conduit (e.g., hose). The water control module may further be integral with shower delivery plumbing, or it may be a separate add-on to existing plumbing.

In another aspect, the water control module includes: a user interface for receiving user inputs of desired water temperature; a temperature sensor for sensing water temperature;

a microprocessor, connected with the temperature sensor and responsive to the inputs to user interface to control water delivery temperature; and, a valve responsive to the microprocessor for delivering water to the user.

One advantage of the water control module is that the module substantially eliminates a person's concern over water temperature fluctuations. In one aspect, the module may be adjusted by a single human hand, to control both temperature and spray characteristics (e.g., massage rhythms).

In yet another aspect, the water control module provides filtering of water flow. By way of example, the water control module may remove at least some of the chlorine and metallic substances in water, or other substances causing the water to have an unwanted smell.

In another aspect, the water control module incorporates a timer to remind the user of one or more time-sensitive functions, or to implement those functions after a set time period, e.g., a bath time period, a time period for a particular massage water flow, a time period for a particular temperature flow, etc.

In another aspect, the water control module is configured to provide information about water being delivered to a user. The water control module of this aspect includes: a user interface for receiving user inputs regarding a desired water temperature; a temperature sensor for measuring water temperature; a microprocessor, connected with the temperature sensor and responsive to the inputs to user interface to alert the user as to whether the temperature of water delivered to the user corresponds to the desired water temperature; and, a display screen for displaying information regarding the desired water temperature and the measured water temperature.

Thus, the water control module combines unique comfort and safety features within a single modular unit. In one aspect, the water control module is multi-functional to provide user selection of optimum shower temperatures, bath time, body message and water quality (i.e., filtering). By way of example, a single movement of a human hand may control water temperature and massage features as well as quality, rhythm and water volume. The water control module thus has particular application for children, the elderly and disabled; the module may be used beneficially in hospitals, medical facilities and physical therapy locations, as well as in beauty and fitness settings, hotels, resorts and sporting clubs, and even health-conscious corporations.

BRIEF DESCRIPTION OF THE DRAWINGS

FIG. 2A is a close-up view of a filter access closure on water plumbing; FIG. 2B shows another water control module with the conventional shower head of FIG. 1A; FIG. 2C shows the direction of attachment of the water control module of FIG. 2B to the shower head; FIG. 2D is a back perspective view of the water control module of FIG. 2B;

DETAILED DESCRIPTION OF THE INVENTION

Figure 1B:
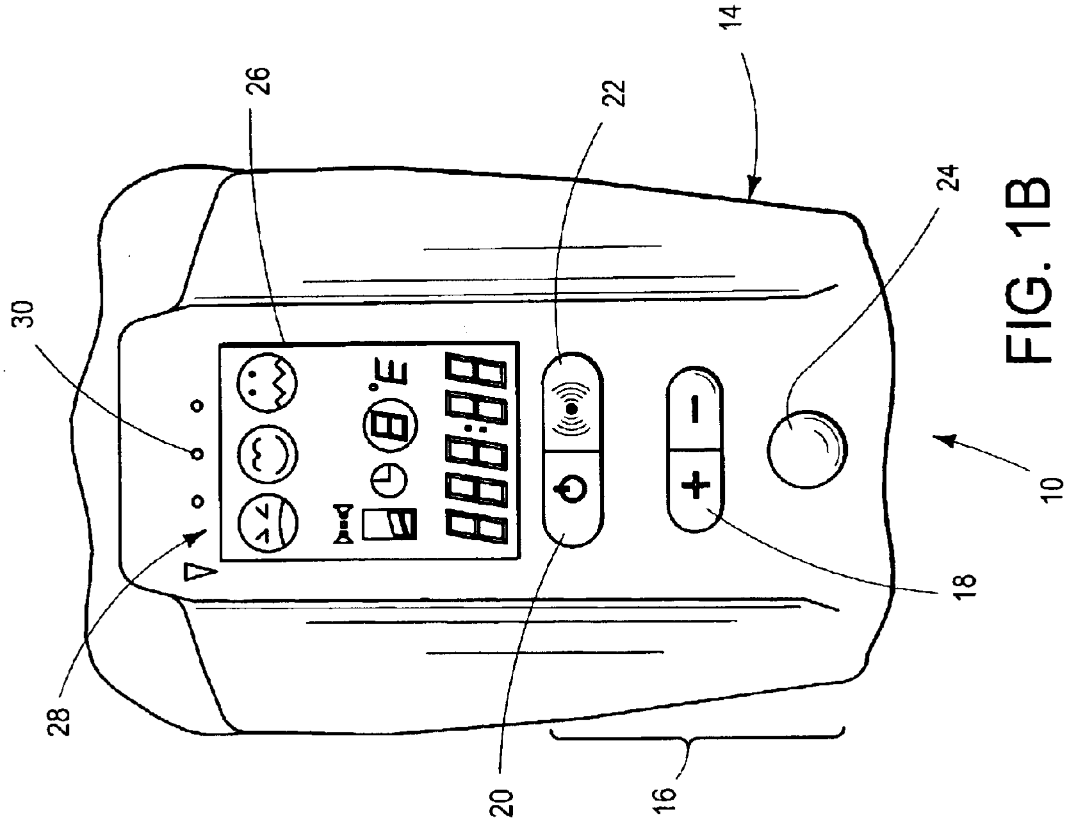
FIG. 1B is a close-up view of the water control module of FIG. 1.
Figure 1A:
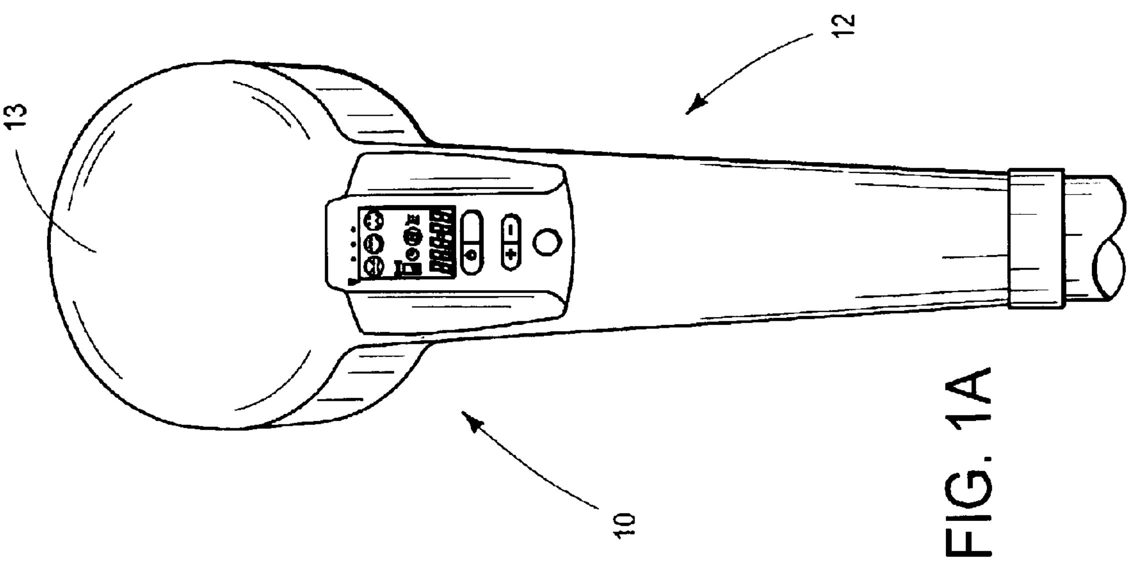
FIG. 1A shows one water control module with a conventional shower head.

FIGS. 1A and 1B and show a water control module 10. Water control module 10 integrates with water plumbing 12 (e.g., a shower head 13) associated with a bath or shower to control water delivery and/or provide information about the water delivered (e.g., water temperature) to a user by, for example, shower head 13. As described herein, module 10 provides for certain beneficial uses in delivering water in a shower or bath. A user interface 14 provides a number of input buttons 16 for controlling the operation of water control module 10. For example, input buttons 16 may include; a magnitude button 18 for incrementally adjusting either the temperature of water delivered by shower head 13 or a timer on water control module 10, upwards or downwards; a power button 20 for turning the water control module 10 on and off; an alarm button 22 for selecting the initiation of an audio alarm when a water temperature sensed by water control module 10 is above or below a particular setting, or an elapsed time is reached, the water temperature and timer values selected with magnitude button 18; and a mode button 24 for selecting various operating modes of water control module 10.

A user of water control module 10 may select a specific water temperature and timer value by viewing a display screen 26 (e.g., a LCD display). Water control module 10 may also illustrate temperature graphically, such as by graphic elements 28 (e.g., hot, warm and cold face icons) on display screen 26, or by separate LEDs 30, or audibly, such as by a microphone (not shown). As shown in FIGS. 2A–2D, water control module 10 is preferably fixed with water plumbing 12 so that a user may remove or alternatively attach module 10 when desired.

FIGS. 2A through 2D shows an exemplary embodiment for integrating water control module 10 with water plumbing 12. As shown in FIG. 2B, shower head 13 has a rotatable knob 31 for selecting certain water flow characteristics. For example, rotatable knob 31 may be used to select water flow volume and/or water flow spray characteristics (e.g., constant stream primarily from a perimeter area of the shower head, constant stream primarily from inside of the perimeter area of the shower head, massage stream, pulsating stream, etc.).

In one embodiment shown in FIG. 2C, water control module 10 couples with a temperature sensor (e.g., sensor 32) that contacts water flow through water plumbing 12. For example, sensor 32 may be integral with shower head 13; when water control module 10 attaches with shower head 13, sensor 32 provides temperature control data to module 10 so that module 10 may control water flow temperature according to the teachings herein. Water control module 10 is preferably battery powered, with a batter access port 34 as shown in FIG. 2D. Also, an electrically conductive contact plate 36 creates an electrically communicative connection between sensor 32 integral with shower head 13 and water control module 10. Water control module 10 may also be attached with shower head 13 by various methods, such as mechanical fasteners, magnets, or other mechanisms, as those of skill in the art appreciate.

FIG. 2A shows one embodiment where a filter 36 is integrated into shower head 13, or some portion of water plumbing 13, to filter unwanted substances (e.g., chlorine, metallic substances, and other odor-causing substances) in water flowing through shower head 13. Filter 36 may be accessed through compartment door 38 for periodic replacement thereof, or for removal if no filtering is desired.

Mode button 24 of FIG. 1B may effect certain functions on water control module 10. Mode button 24, for example, may select: (1) a locking mode to lock the current user settings (e.g., desired water temperature) on water control module 10; (2) a water temperature mode for selecting a desired water temperature manually with magnitude button 18 or from pre-set water temperature ranges; (3) a water flow spray characteristic; or (4) a timer mode to set a timer (e.g., count up or down) for timing the duration of water flow, the duration of water flow at a desired temperature and/or the duration of water flow at a particular spray characteristic.

Figure 3:
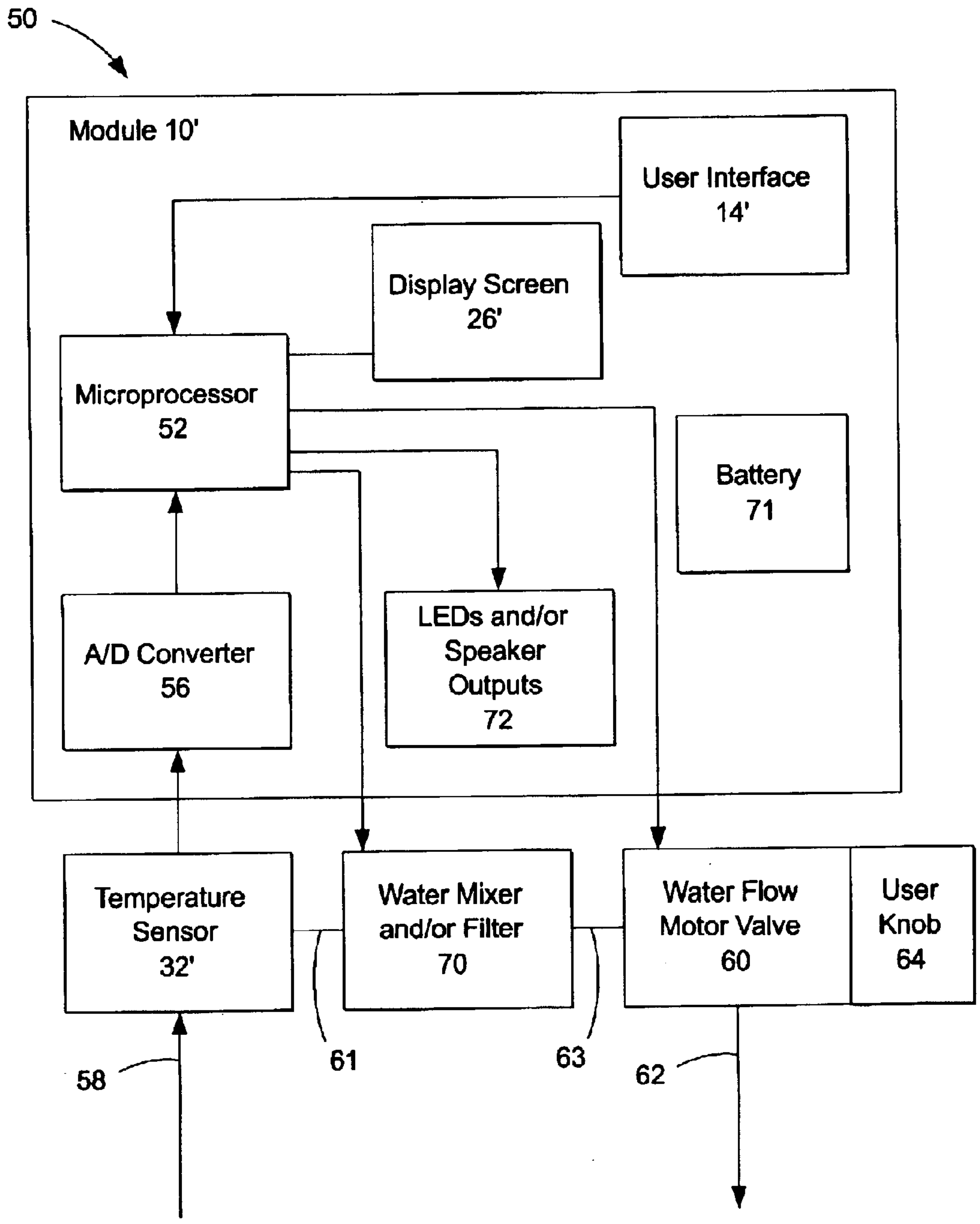
FIG. 3 shows a schematic block diagram of another water control module.

FIG. 3 shows a block schematic 50 illustrating electromechanical operation of one water control module 10'. A microprocessor 52 controls water control module 10' in response to user selections at a user interface 14' (e.g., input buttons 16, FIG. 1). A temperature sensor 32' provides temperature data to microprocessor 52 through an analog-to-digital (A/D) converter 56; temperature sensor 32' monitors temperature of water 58 upstream of water control module 10' (e.g., from house water being delivered to shower head 12). Based on selections at user interface 14' and/or temperature sensor 32' readings, microprocessor 52 sends display data to display screen 26' for viewing by a user. Microprocessor 52 then controls water flow motor valve 60 to deliver water 62 to the user. Water flow motor valve 60 may include a user knob 64 (i.e., a mechanical knob), similar to knob 31, FIG. 2B, controllable by the user to regulate the volume of water flow output of, for example, shower head 13.

In operation, therefore, a user selection of temperature for water flow 62 is monitored by microprocessor 52 via sensor 32'. Water flow 61 is permitted to flow through water flow motor valve 60 only at the correct temperature. In one embodiment, microprocessor 52 controls mixing of hot and cold water 58 of intermediate water flow 61 via water mixer 70. Water flow 61 may transfer between sensor 32' and water flow motor valve 60 via a mechanical conduit 63. Microprocessor 52 further informs the user of temperature by display screen 26', or by one or more outputs 72, e.g., LEDs 30 and speakers of FIG. 1. A battery 71, such as in battery access port 34, FIG. 2D, may power water control module 10'.

Those skilled in the art appreciate that certain modifications may be made to water control modules 10, 10' without departing from the scope of the systems and methods described herein. For example, the location of sensors 32, 32' is a matter of design choice; and sensors 32, 32' may be integrated directly with water control modules 10, 10'. Further, A/D converter 56 may be internal to microprocessor 52. Other electrical components and drivers may replace components of water control module 10' as a matter of design choice to provide like functionality. In one embodiment, water control module 10' does not perform mixing via mixer 70 but instead only monitors temperature via sensor 32' and informs the user of temperature by display screen 26' and outputs 72. In another configuration, microprocessor 52 operates to shutter water flow 61 through water flow motor valve 60 depending upon set temperature; that is, if a user selects "98 degrees" temperature and if water flow 61 is not 98 degrees, microprocessor 52 may shutter valve 60 so that water 62 stops and remains in water plumbing 12 of, for example, a house.

FIG. 3 also illustrates filtering of water flow 61 to remove substances (e.g., chlorine, metallic substances) of water 58. Such a filter may for example integrate in combination with a mixer 70, as a matter of design choice. Control of water control module 10' to implement filter 70 may be electronic, through microprocessor 52, or via manual manipulation; filter 70 may also occur all the time, without selection, as a matter of design choice. Filter 70 may utilize carbon elements, as those of skill in the art appreciate.

Figure 4:
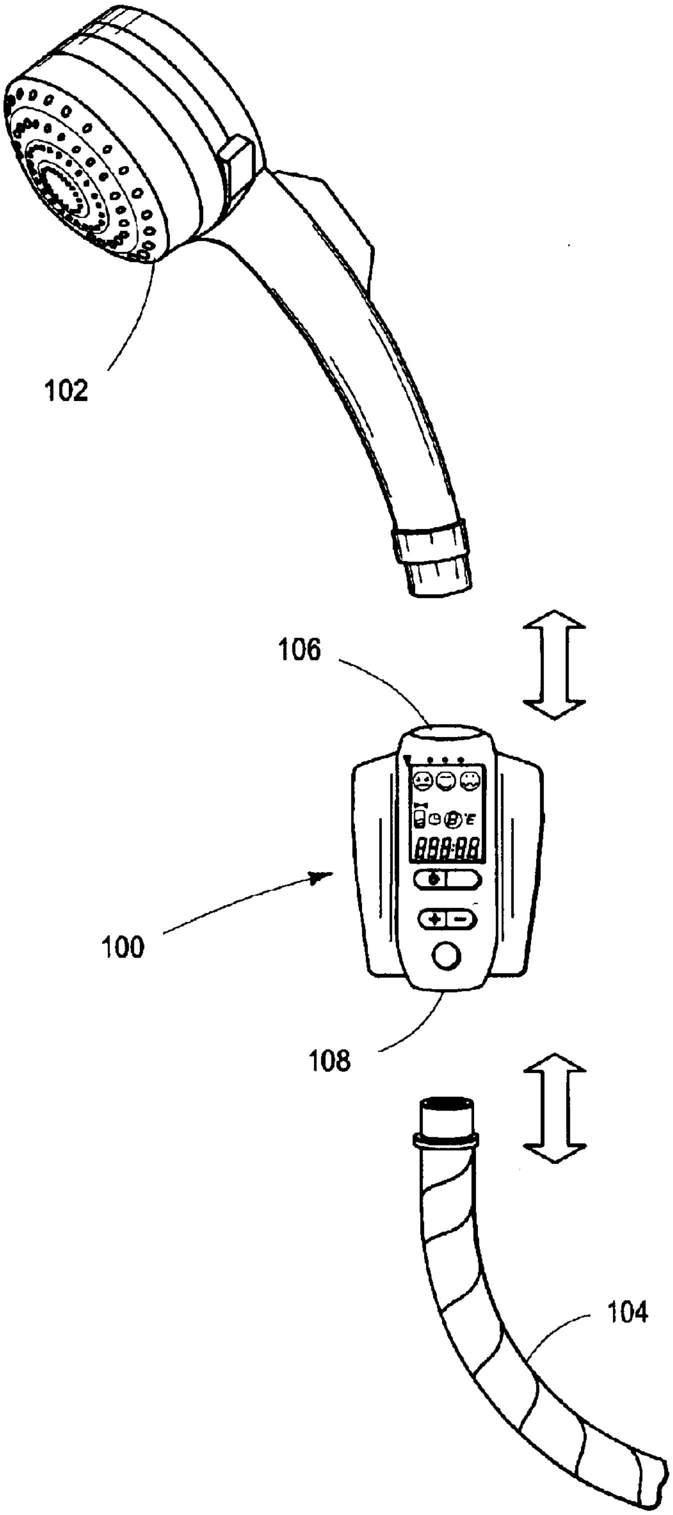
FIG. 4 shows another water control module, integrated with a conventional shower head and shower hose.

FIG. 4 shows one water control module 100 that may include features of modules 10, 10', of FIGS. 1 and 3, respectively. Water control module 100 has an output end 106 for coupling with a conventional shower head 102 and an input end 108 for coupling with a conventional shower hose 104 or similar plumbing, such that module 100 is positioned between shower head 102 and shower hose 104. Alternatively, both module output end 106 and input end 108 may couple to shower hose 104, as a matter of design choice. Preferably, output end 106 and input end 108 are threadingly connected (i.e., screwed together) with shower head 102 and shower hose 104, respectively. In this way, water control module 100 can provide temperature sensing and water delivery controls as described herein for modules 10, 10'.

Figure 5:
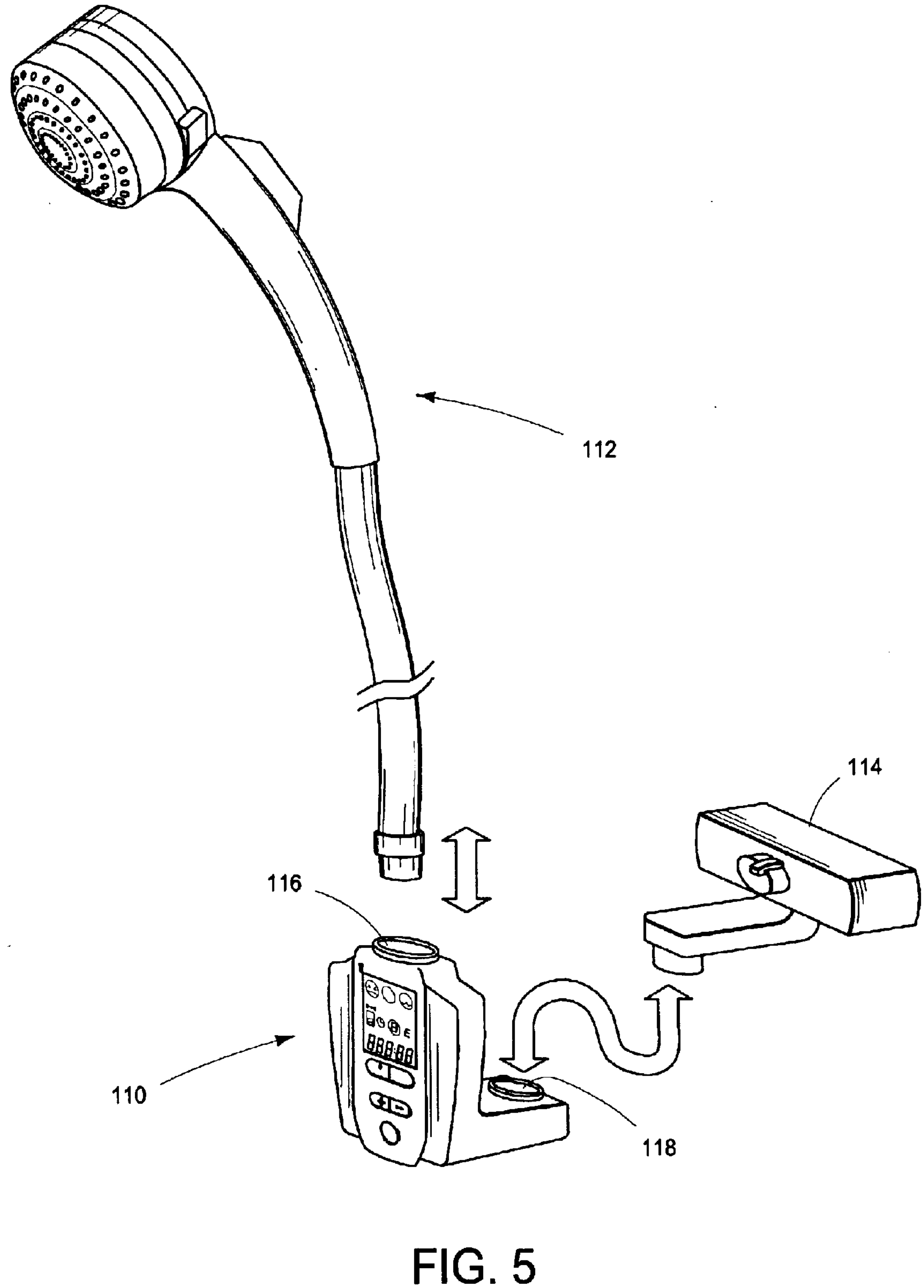
FIG. 5 shows another water control module, integrated with a shower hose and faucet.

In a similar fashion to water control module 100, FIG. 5 shows another water control module 110 that may include features of modules 10, 10' and 100, of FIGS. 1, 3 and 4, respectively. Water control module 110 has an output end 116 for coupling with a conventional shower hose 112 and an input end 118 for coupling with a conventional shower valve or faucet output 114 or similar plumbing, such that module 100 is positioned between shower hose 112 and faucet output 114. Preferably, output end 116 and input end 118 are threadingly connected with shower hose 112 and faucet output 114, respectively. In this way, water control module 110 can provide temperature sensing and water delivery controls as described herein for modules 10, 10' and 100.

Figure 6:
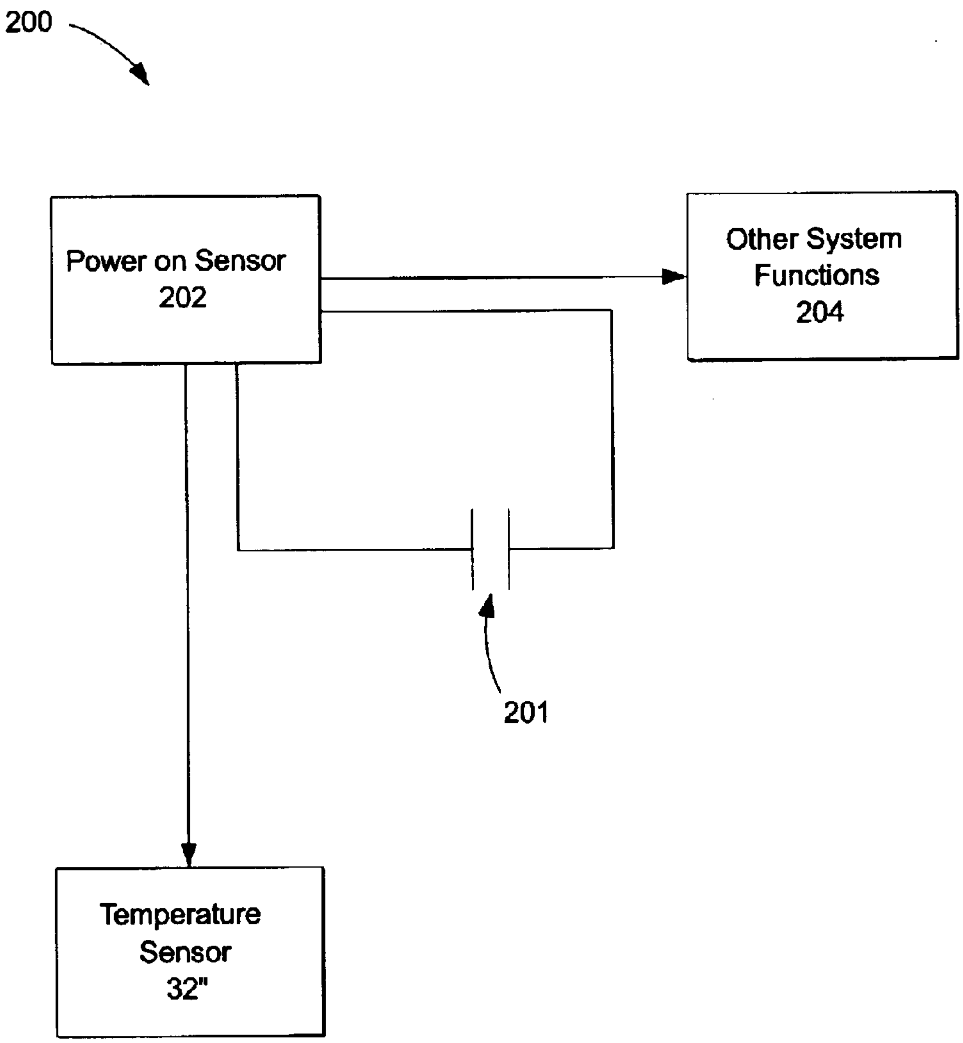
FIG. 6 shows a schematic block diagram of a switching unit.

FIG. 6 shows one circuit 200 that may be implemented in water control modules 10, 10', 100 and 110. Circuit 200 may, for example, couple with block schematic 50, FIG. 3, so as to provide activation/deactivation of water control modules 10, 10', 100, 110. A power-on sensor 202 couples with a switch 201 that is closed by moisture at water control module 10, 10', 100, 110. Switch 201 may be made from metal contact plates at a rear of water control module 10, 10', 100, 110 and near a temperature sensor 32" (e.g., a thermister), in one example. When switch 201 closes, sensor 32" may be engaged to begin temperature sensing with other system functions 204 (e.g., the display or audio indicators that inform the user of measured temperature, etc.). Those skilled in the art appreciate that power-on sensor 202 may be formed by microprocessor 52 operating in "sleep mode" (i.e., when moisture bridges switch 201, microprocessor 52 wakes up and begins other system functions 204).

Figure 7:
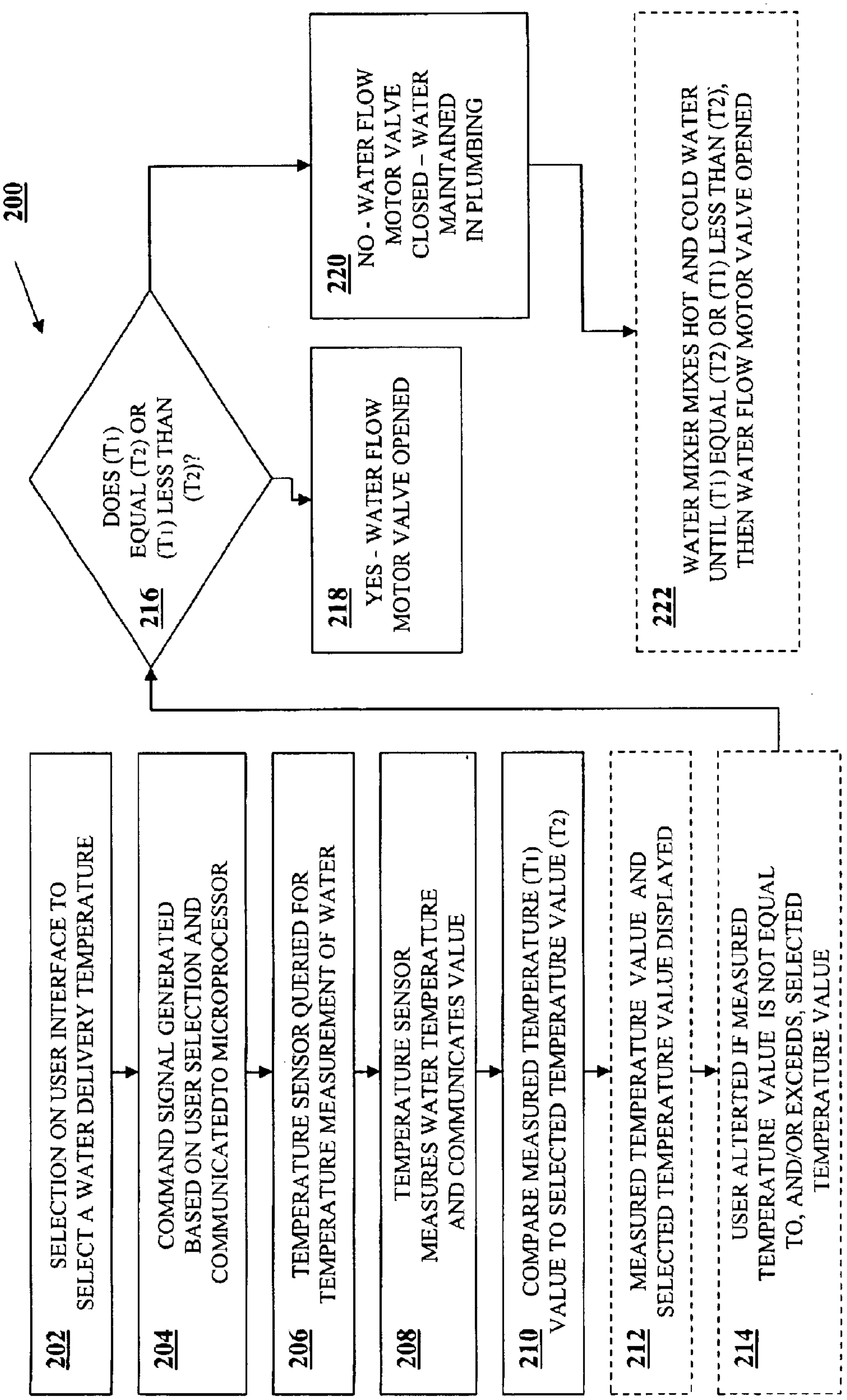
FIG. 7 shows a process for controlling water delivery through water plumbing by another water control module.

FIG. 7 shows a process 200 for controlling water delivery through water plumbing 12 by water control module 10, 10', according to certain user selections made on the module. Process 200 for example includes certain software functions and/or routines controlling a water control module, such as water temperature sensing, timing of water delivery through water plumbing and/or mixing hot and cold water for delivery through water plumbing, to facilitate each described step. At step 202, a user makes certain selections on user interface 14', FIG. 3, such as by initiating input on magnitude button 18, FIG. 1, to select a desired temperature value or temperature range (e.g., selected from a pre-programmed range) for water delivery through water plumbing 12. User interface 14', at step 204, generates a command signal based on the user input and communicates the signal to microprocessor 52; microprocessor 52 then, at step 206, queries temperature sensor 32' for a temperature measurement of water 58. At step 208, temperature sensor 32' measures the temperature of water 58, generates a signal indicative of the measured temperature value, and communicates the signal to microprocessor 52. At step 210, microprocessor 52 compares the temperature value (T1) of water 58 received from sensor 32' to the value or range of values (T2) selected on user interface 14'. Optionally, at step 212, the temperature value (T1) sensed by sensor 32' and the temperature value or range of values (T2) selected on user interface 14' are displayed on display screen 26', and if (T1) is not equal to, or approximately equal to (T2), or alternatively, if (T1) is greater than (T2), then, at step 214, display screen 26', or one or more outputs 72, e.g., LEDs 30 and speakers of FIG. 1, will alert the user as to this condition. At step 216, a determination is made by microprocessor 52 as to whether (T1) is equal to, or approximately equal to (T2), or alternatively, if (T1) is less than (T2); if yes, then at step 218, water flow motor valve 60 is opened to allow the flow of water 62 to the user (e.g., through shower head 13); if no, then at step 220, water flow motor valve 60 is closed to maintain water 62 within water plumbing 12. Optionally, at step 222, hot and cold water flow 61 enters water mixer 70, in thermal communication with temperature sensor 32' and mechanical conduit 63, so that water is uninterrupted in flow to the user, where water 61 is mixed in proportions directed by microprocessor 52 until (T1) is equal to, or approximately equal to (T2), or alternatively, (T1) is less than (T2); at which point, process 200 returns to step 218.

Figure 8:
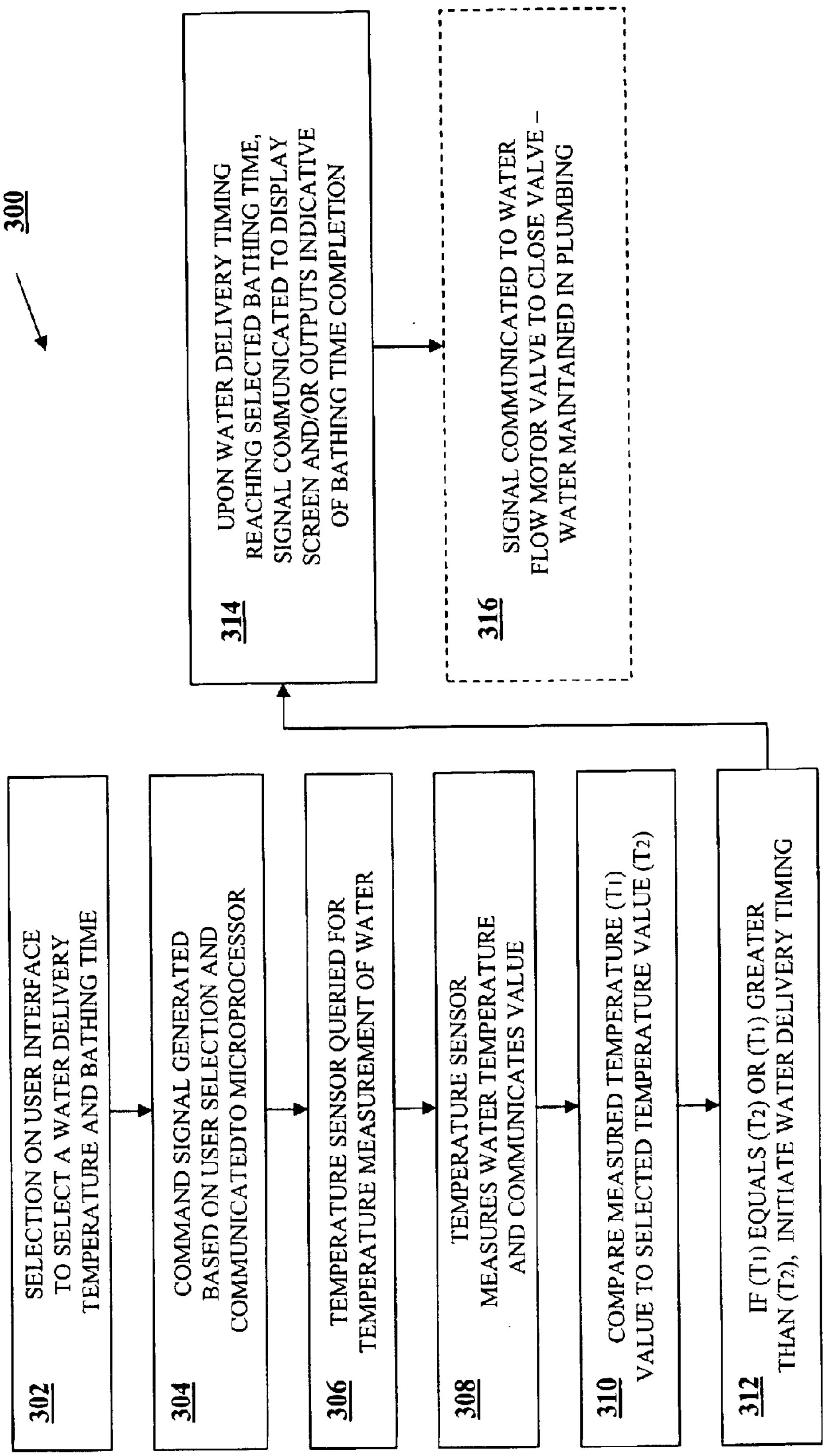
FIG. 8 shows a process for timing water delivery at a specified temperature through water plumbing by another water control module.

FIG. 8 shows a process 300 for timing water delivery at a specified temperature through water plumbing 12 by water control module 10, 10', according to certain user selections made on the module. Process 300 for example includes certain software functions and/or routines controlling a water control module, such as water temperature sensing, timing of water delivery through water plumbing and/or mixing hot and cold water for delivery through water plumbing, to facilitate each described step. At step 302, a user makes selections on user interface 14', FIG. 3, such as by initiating input on magnitude button 18, FIG. 1, to select (a) a desired temperature value or temperature range (e.g., selected from a pre-programmed range) for water delivery through water plumbing 12, and/or (b) a desired time of bathing at the desired temperature value or temperature range. User interface 14', at step 304, generates a command signal based on the user input and communicates the signal to microprocessor 52; microprocessor 52 then, at step 306, queries temperature sensor 32' for a temperature measurement of water 58. At step 308, temperature sensor 32' measures the temperature of water 58, generates a signal indicative of the measured temperature value, and communicates the signal to microprocessor 52. At step 310, microprocessor 52 compares the temperature value (T1) of water 58 received from sensor 32' to the value or range of values (T2) selected on user interface 14'. If (T1) is equal to, or approximately equal to (T2), or alternatively, if (T1) is greater than (T2), then, at step 312, microprocessor 52 will begin timing deliver of water 62. At step 314, upon the time of water delivery reaching the desired time of bathing inputted on user interface 14', microprocessor will generate a signal and communicate the signal to display screen 26', or one or more outputs 72, e.g., LEDs 30 and speakers of FIG. 1, to notify the user of the completion of the bathing period. Optionally, at step 316, because of the completion of the bathing period, microprocessor 52 may further generate a signal and communicate the signal to water flow motor valve 60 to close the valve 60 to maintain water 62 within water plumbing 12.

Since certain changes may be made in the above methods and systems without departing from the scope hereof, it is intended that all matter contained in the above description or shown in the accompanying drawings be interpreted as illustrative and not in a limiting sense. It is also to be understood that the following claims are to cover certain generic and specific features described herein.

What is claimed is:

1. A system for controlling water delivery to a user, the system constructed and arranged with water delivery plumbing and comprising:

a user interface for receiving user inputs of desired water temperature comprising a mode button for alternatively selecting one of a pre-set water temperature range or a desired water temperature value, and a magnitude button to select upwards and downwards one of a set of pre-set water temperature ranges or a specific water temperature;

a temperature sensor for sensing water temperature;

a microprocessor, connected with the sensor and responsive to the inputs to control water delivery temperature; and a valve responsive to the microprocessor for delivering water to the user.

2. The system of claim 1, the mode button being further configured for selection of a desired duration of water delivery, and the magnitude button being further configured to select upwards and downwards a numeric range of water delivery times.

3. The system of claim 2, the mode button being further configured for selection of a locking feature to prevent changes to the current user settings.

4. The system of claim 1, further comprising an alert button for initiating an audible alert to sound when the temperatures sensor senses one or more of a water temperature above a chosen magnitude and below a chosen magnitude.

5. The system of claim 1, further comprising a modular housing for protecting internal electronics and for attachment to, and alternatively removal from, the water delivery plumbing.

6. The system of claim 5, the water delivery plumbing comprising a shower head.

7. The system of claim 1, further comprising a shower head coupled with the water delivery plumbing and having single hand control selection of one or more of a particular water volume and water massage rhythm.

8. The system of claim 7, the temperature sensor being integrated with the shower head for electrically coupling with the microprocessor when a housing containing the microprocessor couples with the shower head.

9. The system of claim 7, the shower head configured to selectively deliver one or more of no water delivery, a pulsating water stream, a steady water stream primarily from a perimeter area of the shower head, and a steady water stream primarily from inside of the perimeter area of the shower head.

10. The system of claim 1, further comprising a battery for powering the system as a mobile, modular unit.

11. The system of claim 1, further comprising a display screen for informing the user of selections and controls.

12. The system of claim 11, wherein the display screen is an LCD display showing a non-numeric graphic of water temperature.

13. The system of claim 12, wherein the non-numeric graphic comprises a first graphic component illuminating when the water temperature sensed is below the desired water temperature input by the user, a second graphic component illuminating when the water temperature sensed is the same as the desired water temperature input by the user, and a third graphic component illuminating when the water temperature sensed is above the desired water temperature input by the user.

14. The system of claim 11, further comprising a timer, and the display screen being configured for display of a timer value.

15. The system of claim 1, further comprising a plurality of illuminators for informing the user of approximate temperatures.

16. The system of claim 15, wherein the plurality of illuminators comprise a first illuminator to indicate when the water temperature sensed is below the desired water temperature input by the user, a second illuminator to indicate when the water temperature sensed is the same as the desired water temperature input by the user, and a third illuminator to indicate when the water temperature sensed is above the desired water temperature input by the user.

17. The system of claim 1, further comprising a water mixer, responsive to the microprocessor, for mixing hot and cold water for delivery to the user.

18. The system of claim 1, further comprising a filter for removing one or more of unwanted substances and smell from the water delivered to the user.

19. The system of claim 1, the system constructed and arranged between a conventional shower valve and conventional shower hose.

20. A system for controlling water delivery to a user, the system constructed and arranged with water delivery plumbing between a conventional shower head and conventional shower hose and comprising:

a user interface for receiving user inputs of desired water temperature;

a temperature sensor for sensing water temperature;

a microprocessor, connected with the sensor and responsive to the inputs to control water delivery temperature; and a valve responsive to the microprocessor for delivering water to the user.

21. A system for providing information about water delivered to a user, the system constructed and arranged with water delivery plumbing and comprising:

a user interface for receiving user inputs regarding a desired water temperature;

a temperature sensor for measuring water temperature;

a microprocessor, connected with the sensor and responsive to the inputs to alert the user as to whether the temperature of water delivered to the user corresponds to the desired water temperature; and a display screen for displaying information regarding the desired water temperature and the measured water temperature wherein the display screen is an LCD display showing a non-numeric graphic of water temperature.

22. The system of claim 21, further comprising a modular housing for protecting internal electronics and for attachment to, and alternatively removal from, the plumbing.

23. The system of claim 21, wherein the non-numeric graphic comprises a first graphic component illuminating when the water temperature measured is below the desired water temperature input by the user, a second graphic component illuminating when the water temperature measured is the same as the desired water temperature input by the user, and a third graphic component illuminating when the water temperature measured is above the desired water temperature input by the user.

24. A system for providing information about water delivered to a user, the system constructed and arranged with water delivery plumbing and comprising:

a user interface for receiving user inputs regarding a desired water temperature and comprising a mode button for alternatively selecting one of a pre-set water temperature range or a desired water temperature value, and a magnitude button to select upwards and downwards one of a set of pre-set water temperature ranges or a specific water temperature value;

a temperature sensor for measuring water temperature;

a microprocessor, connected with the sensor and responsive to the inputs to alert the user as to whether the temperature of water delivered to the user corresponds to the desired water temperature; and a display screen for displaying information regarding the desired water temperature and the measured water temperature.

25. The system of claim 24, the mode button being further configured for selection of a desired duration of water delivery, and the magnitude button being further configured to select upwards and downwards a numeric range of water delivery times.

26. The system of claim 25, wherein the display screen is further configured to display information regarding a timed duration of water delivery.

27. A method for delivering bath water to a user, comprising the steps of: coupling a water control module to bath plumbing; receiving, at the module, user inputs for desired water temperature though a mode button to alternatively select one of a pre-set water temperature range or a desired water temperature range, and through a magnitude button to select upwards and downwards one of a set of pre-set water temperature ranges or a numeric range of desired water temperatures; monitoring, at the module, temperature of the water; and controlling, at the module, water delivered to the user based on the desired water temperature.

28. The method of claim 27, further comprising the step of filtering the water through the module to remove one or more of unwanted substances and smell.

29. The method of claim 27, the step of coupling comprising coupling the module between a shower valve and a shower hose.

30. The method of claim 27, further comprising the step providing a multi-functional shower head for coupling with the module and the plumbing, the shower head and module being controllable by one hand to adjust water massage rhythm and water volume.

31. The method of claim 27, the step of receiving, at the module, user inputs further comprising receiving inputs though the mode button to select a desired duration of water delivery, and through the magnitude button to select upwards and downwards a numeric range of water delivery times.

32. The method of claim 27, further comprising displaying information to the user on a display screen relating to module selections and controls.

33. The method of claim 27, the step of controlling, at the module, water delivered to the user comprises a microprocessor sending a signal to a water mixer, to mix hot and cold water in such proportions as to deliver water to the user based on the desired water temperature.

34. A method for delivering bath water to a user, comprising the steps of:

coupling a water control module to bath plumbing between a shower head and a shower hose;

receiving, at the module, user inputs for desired water temperature;

monitoring, at the module, temperature of the water; and controlling, at the module, water delivered to the user based on the desired water temperature.

* * * * *